Nov. 12, 1929.  J. McW. STONE  1,735,476
ACOUSTIC HORN AND METHOD OF AND APPARATUS FOR MAKING THE SAME
Filed Sept. 22, 1927    4 Sheets-Sheet 1

Inventor:
John McWilliams Stone,
By Dyrenforth, Lee, Chritton & Wiles,
Attys.

Nov. 12, 1929.  J. McW. STONE  1,735,476
ACOUSTIC HORN AND METHOD OF AND APPARATUS FOR MAKING THE SAME
Filed Sept. 22, 1927   4 Sheets-Sheet 2
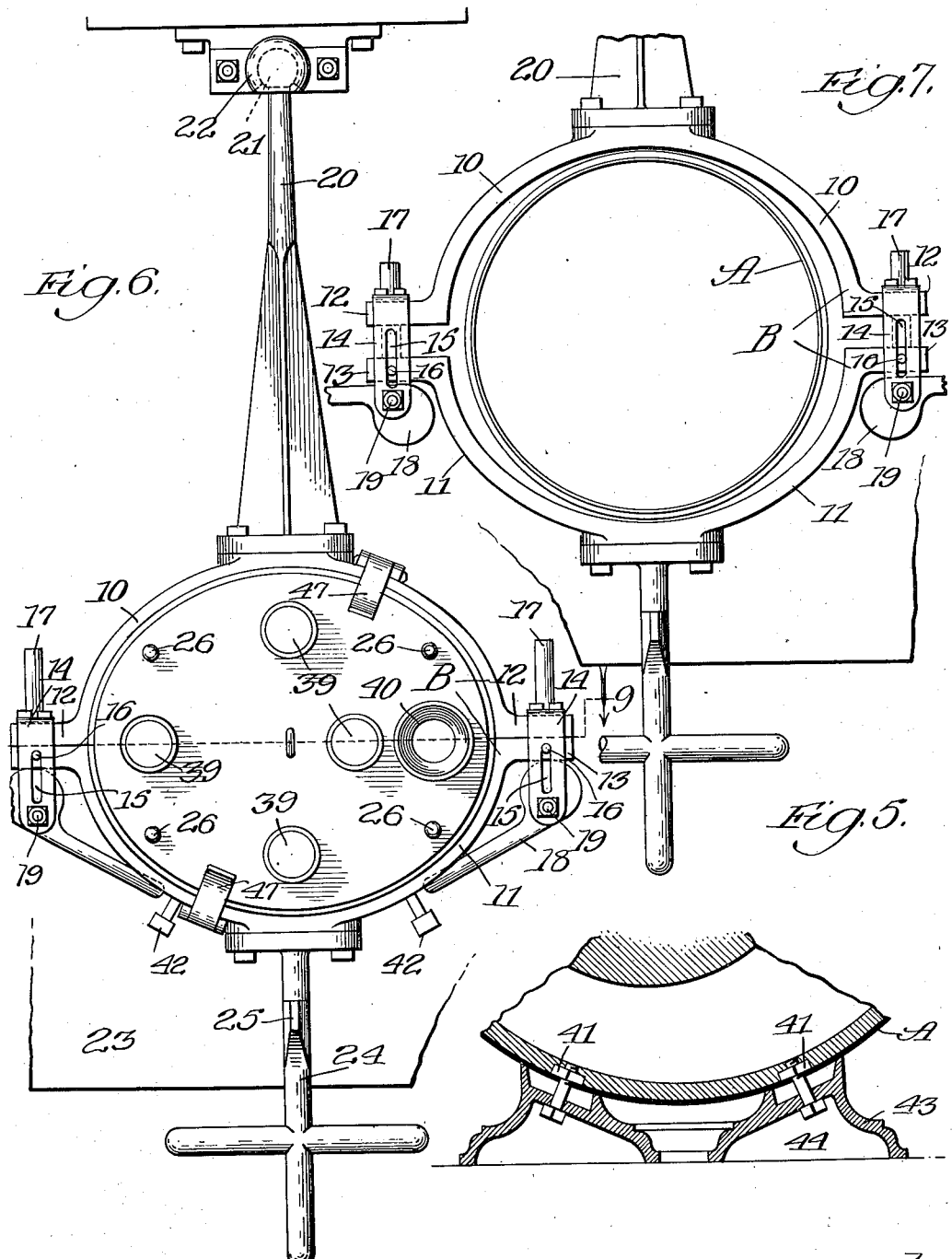
Inventor,
John McWilliams Stone,
By Dyrenforth, Lee, Chritton & Wiles,
Attys.

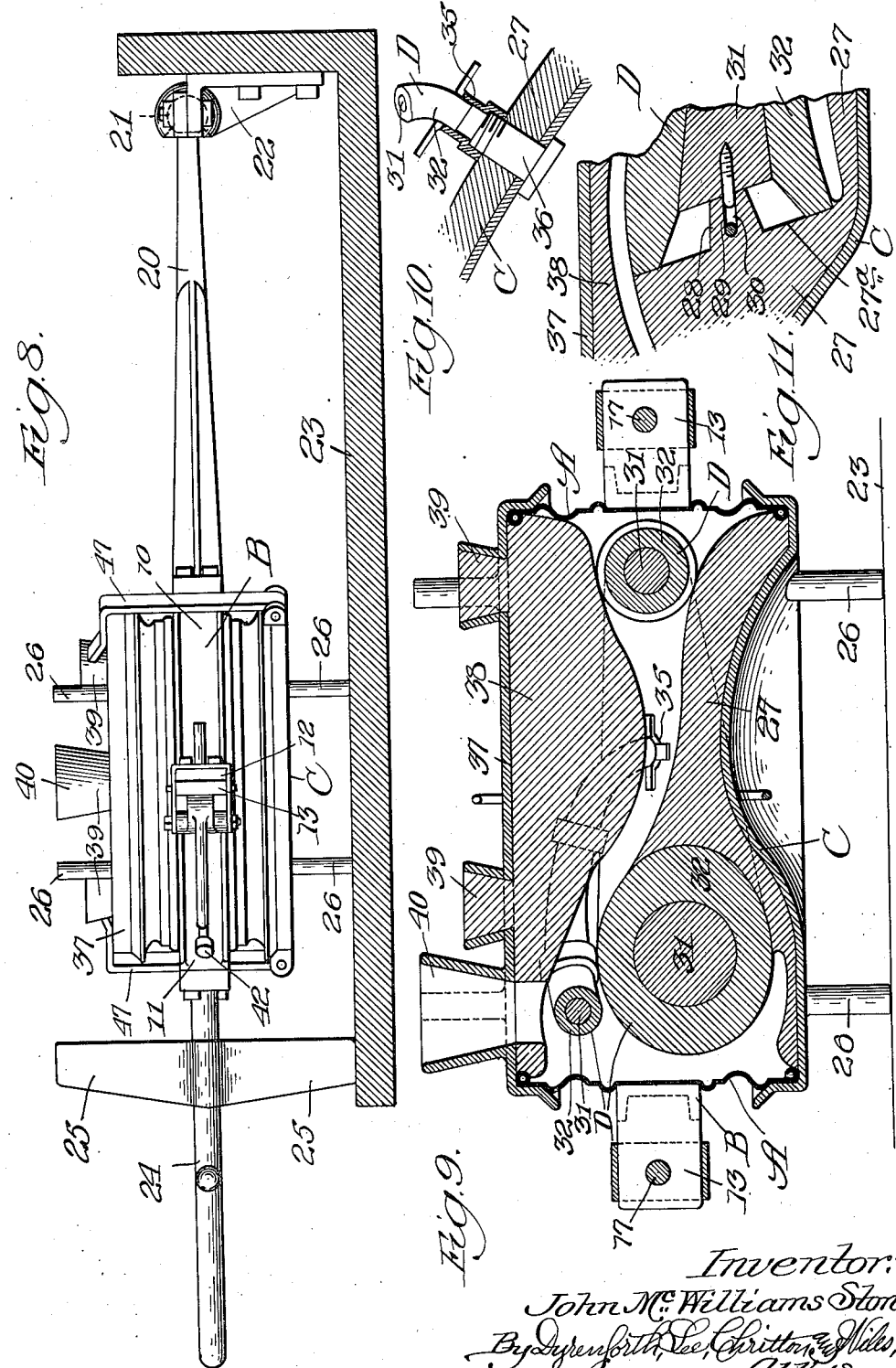

Nov. 12, 1929.  J. McW. STONE  1,735,476
ACOUSTIC HORN AND METHOD OF AND APPARATUS FOR MAKING THE SAME
Filed Sept. 22, 1927  4 Sheets-Sheet 4

Inventor:
John McWilliams Stone,

Patented Nov. 12, 1929

1,735,476

UNITED STATES PATENT OFFICE

JOHN McWILLIAMS STONE, OF CHICAGO, ILLINOIS, ASSIGNOR TO OPERADIO MANUFACTURING CO., OF CHICAGO, ILLINOIS, A CORPORATION OF ILLINOIS

ACOUSTIC HORN AND METHOD OF AND APPARATUS FOR MAKING THE SAME

Application filed September 22, 1927. Serial No. 221,292.

This invention relates to an acoustic horn and method of and apparatus for making same.

The invention is fully described in the following specification and shown in the accompanying drawings, in which:

Fig. 5 is a partial section of the lower part of the horn taken on the line 5 of Fig. 2;

Fig. 6 is a top plan view of the clamp and mold for making the horn;

Fig. 7 is a partial plan view of the same showing the clamp open and the top removed;

Fig. 8 is a side elevation of the same;

Fig. 9 is a section on the line 9 of Fig. 13;

Fig. 10 is a partial enlarged section on the line 10 of Fig. 12, showing the small end of the horn with threaded thimble;

Fig. 11 is a partial section on the line 11 of Fig. 12 showing the large end of the horn;

Figure 1:
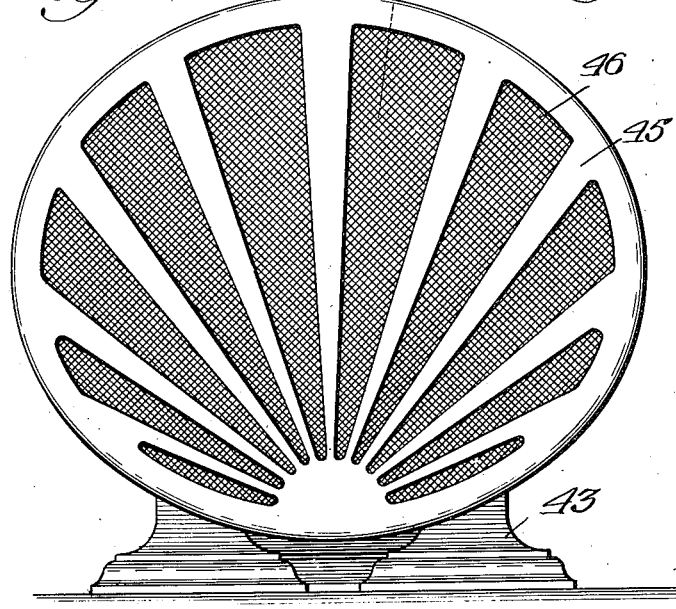
Figure 1 is a front elevation of the completed horn.

Briefly, this horn is made by taking a cylindrical sheet metal drum A (Fig. 7), placing it in a clamp B which when closed forces it into an elliptical desired form after which a bottom C (Fig. 9) is forced over the edge of the drum, the whole being held in place by gravity and by friction. A flexible mold D, (Fig. 13) of gelatin, rubber or the like, is then placed against the drum A and coiled somewhat as shown, the overlapping portions of the coil being separated by any suitable form of spacer. The form is then filled with a suitable mixture of freshly prepared gypsum and water or the like which then quickly sets or hardens so that the flexibly tapered coil D may be withdrawn and the bottom C removed leaving the horn cast in gypsum within the cylinder A.

The clamp B consists essentially of two semi-elliptical sections 10 and 11 which terminate in laterally extending ears 12 and 13 respectively. A U-shaped member 14 is secured to each of the ears 12 and has slots 15 through which pass pins 16 which are carried by the ears 13. The ears 13 also carry pins 17 which extend through corresponding holes in the ears 12 so as to guide the two halves of the clamp. An eccentric cam lever 18 is pivotally carried on the bolt 19 which extends through the U-shaped member 14 and bears upon the ear 13. When the cam levers 18 are drawn outwardly they permit the clamp sections 10 and 11 to be separated as shown in Fig. 7. Drawing the cam levers 18 as shown in Fig. 6, forces the two clamp sections together.

Figure 2:
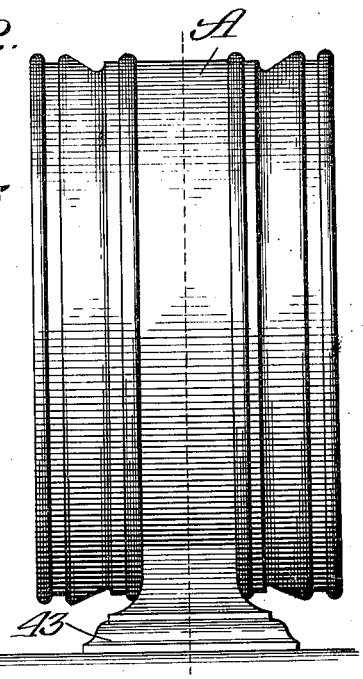
Fig. 2 is a side elevation of the same.

The cylinder A is made in circular form as shown in Fig. 7 and may have a series of beads as shown in Fig. 2. This cylinder, which is preferably of sheet metal or the like, is placed between the two clamp sections 10 and 11 after which the clamps 18 are turned so as to cause the clamps to close forcing the cylinder A from the circular into the elliptical form. It will be understood however that it may be pressed into other shapes if desired.

The clamp section 10 has an arm 20 secured thereto, the outer end of this arm having a ball 21 formed thereon which is mounted in a spherical socket 22 which in turn is secured to the table 23 upon which the clamp rests.

The clamp section 11 carries a handle 24 by which it may be turned. This handle has feet 25 extending in opposite directions and of a height which will keep the clamp substantially horizontal when either of the feet rest upon the table 23.

With the clamp sections 10 and 11 secured about a cylinder A, the bottom of the cylinder is closed by means of a bottom mold C which fits tightly around the bottom of the cylinder A as shown in Fig. 9 and has legs 26 whereby it rests upon the table-top 23.

Figure 12:
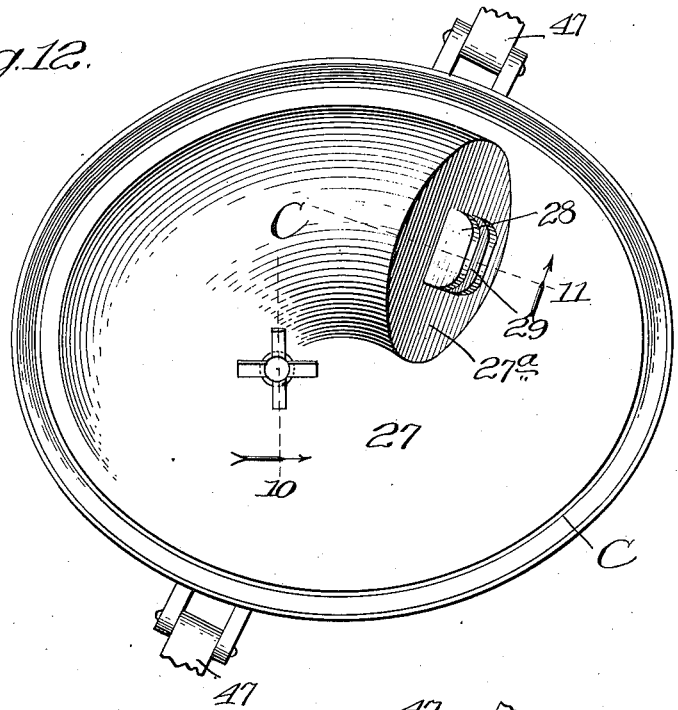
Fig. 12 is a top plan view of the bottom of the mold with the cylinder housing in place thereon.

The bottom mold C has a lining of gelatin, rubber or the like 27 which is so formed as to shape the front or bell of the horn and has an abrupt surface 27$^a$ (Fig. 12) adapted to receive the large end of the core D. Lugs 28 extend from the surface 27 and have a slot 29 adapted to receive a ring or eyelet 30 which is carried by the core D.

This core preferably has a lead center 31 into which the eyelet 30 is secured, this center being surrounded by a coating 32 of gelatin, rubber or the like. If desired, the entire core may be made of gelatin, the use of which is well known in the art of making statuettes or the like. When, however, a core having a center 31 of lead or the like is used, the core is self-supporting and therefore does not require chaplets, separators or the like to separate the overlapping portions of the core.

Figure 13:
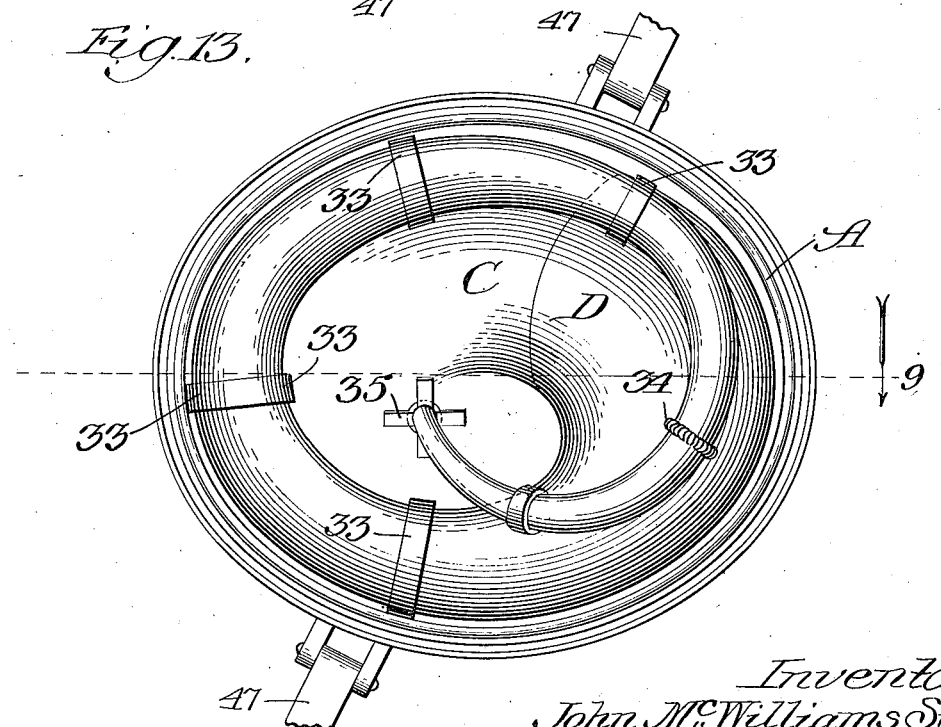
Fig. 13 is a similar view of the same showing the flexible core in place ready for pouring.

The core is then coiled within the cylinder as shown in Fig. 13, sufficient space being left between the outer portion of the core D and the shell to insure a sufficiently thick wall. If desired, rings or chaplets 33 are placed around the core or any other means may be used to insure a proper spacing for the filling material for the core itself. These chaplets may be made of the same material as that which is used for filling the horn or they may be made of a spiral spring as shown at 34.

The small end of the core is then led into a thimble 35 which has previously been placed within the bottom mold C and secured in place by means of a screw 36 extending therethrough from the bottom. The small end of the core D is thus firmly anchored.

If desired, a mold top 37 may be fitted over the shell A, top carrying a gelatin form 38 which is secured thereto by means of lugs 39 extending through suitable openings in the mold top. A mouth 40 is provided whereby the material for filling the horn may be poured.

This material, consisting largely of plaster of Paris with a suitable coloring matter, is mixed with water after which it is poured into the mold, the operator striking the mold so as to cause the material to flow to all parts of the mold. This is then allowed to stand until it is hard enough to permit the mold to be removed. It is then turned upside down and the bottom mold C removed after the screw has been withdrawn, thereby exposing the large end of the core D. Some of the pouring material may have gotten in between the face 27 and the large end of the core D, but if so this can be removed very readily with a knife after the bottom mold has been withdrawn. This can be assisted by pressing any suitable instrument through the sleeve 35 against the small end of the core D.

It will be understood that the mold top 37, 38 may be omitted entirely, the pouring then being done through the open top of the shell A and the material can then be supplied by hand, the final contour being formed by hand while the material is solidifying.

Thus it will be seen that a very simple and efficient method has been devised for making a horn and one which provides a horn which is self-contained.

The horn thus made may be decorated in any desired manner as by painting or laquering and may be placed upon any suitable support. The horn when thus made still contains a considerable quantity of moisture and this may be driven out by heating it in a suitable drying room while hot air is caused to pass over it.

Figure 3:
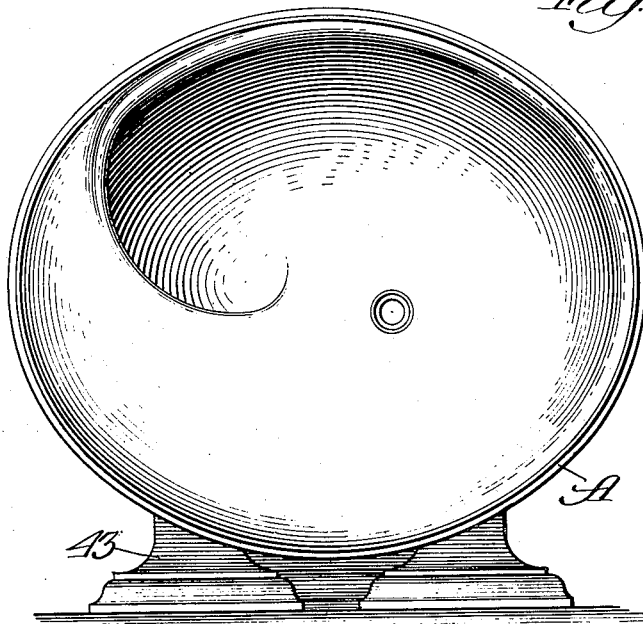
Fig. 3 is a front elevation showing the grille-work front removed.
Figure 4:
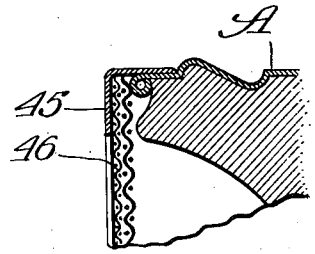
Fig. 4 is a partial enlarged section on the line 4 of Fig. 1.

In the operation of placing the shell in the clamp in the first instance, nuts 41 are placed within the shell and are held by means of suitable bolts 42 in one of the clamp sections. These nuts are then cast in the horn and are retained so that a base 43 (Fig. 3) may be secured to the shell by means of bolts 44 which are screwed into the nuts 41.

A suitable front 45 may be then secured in place by snapping it over the edge of the shell and this carries a suitable screen 46.

Clamps 47 or the like may be used to hold the mold bottom C and the top mold 37 on the drum A. When the bottom mold C is used alone, these clamps are not used, the weight of the whole resting upon the lower mold C.

While I have shown and described but a single embodiment of this invention, it is to be understood that it is capable of many modifications. Changes therefore in the construction and arrangement may be made which do not depart from the spirit and scope of the invention as disclosed in the appended claim.

It is to be particularly noted that the sheet metal drum A is open ended and when first formed takes the natural circular shape. This shape, however, is not always the final desired shape for the horn. By putting it in the form or clamp B, it is forced into any desired shape. For example, as shown, it is distorted into an elliptical shape or form. The drum is then filled with gypsum or plaster, as above described, and this plaster hardens or sets. This hardening or setting of the plaster then serves to permanently hold the drum A in the desired shape; and the drum will retain its shape even after the clamp B is removed.

I claim:

The method of making a loud speaker horn including; forming an open ended drum of sheet metal; deforming said drum out of its cylindrical shape by suitable shaping means and temporarily holding said drum in said deformed shape by said shaping means; casting a loud speaker horn in said drum, allowing the same to harden while so temporarily holding the drum in its deformed shape; and removing the shaping means, permitting the drum to remain on the casting as a part of the loud speaker horn and permanently held in its deformed shape by said casting.

In testimony whereof I have hereunto set my hand this 15th day of September, 1927.

JOHN McWILLIAMS STONE.